June 27, 1961  K. R. LAGLER  2,990,060
ARTICLE INSPECTING APPARATUS
Filed Aug. 26, 1959  4 Sheets-Sheet 1
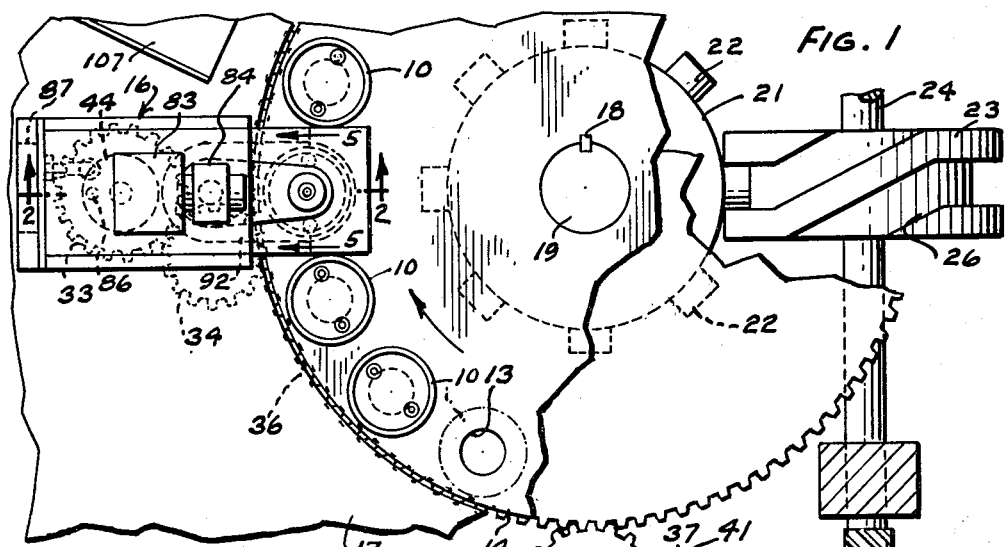
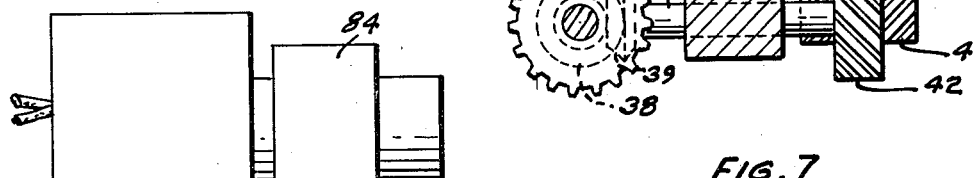
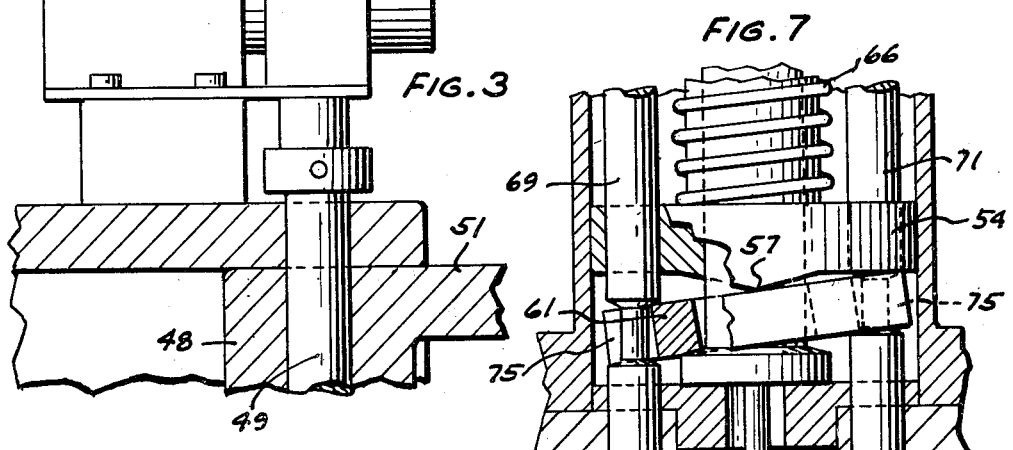
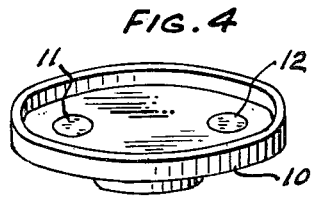
INVENTOR
K. R. LAGLER
BY R. P. Miller
ATTORNEY

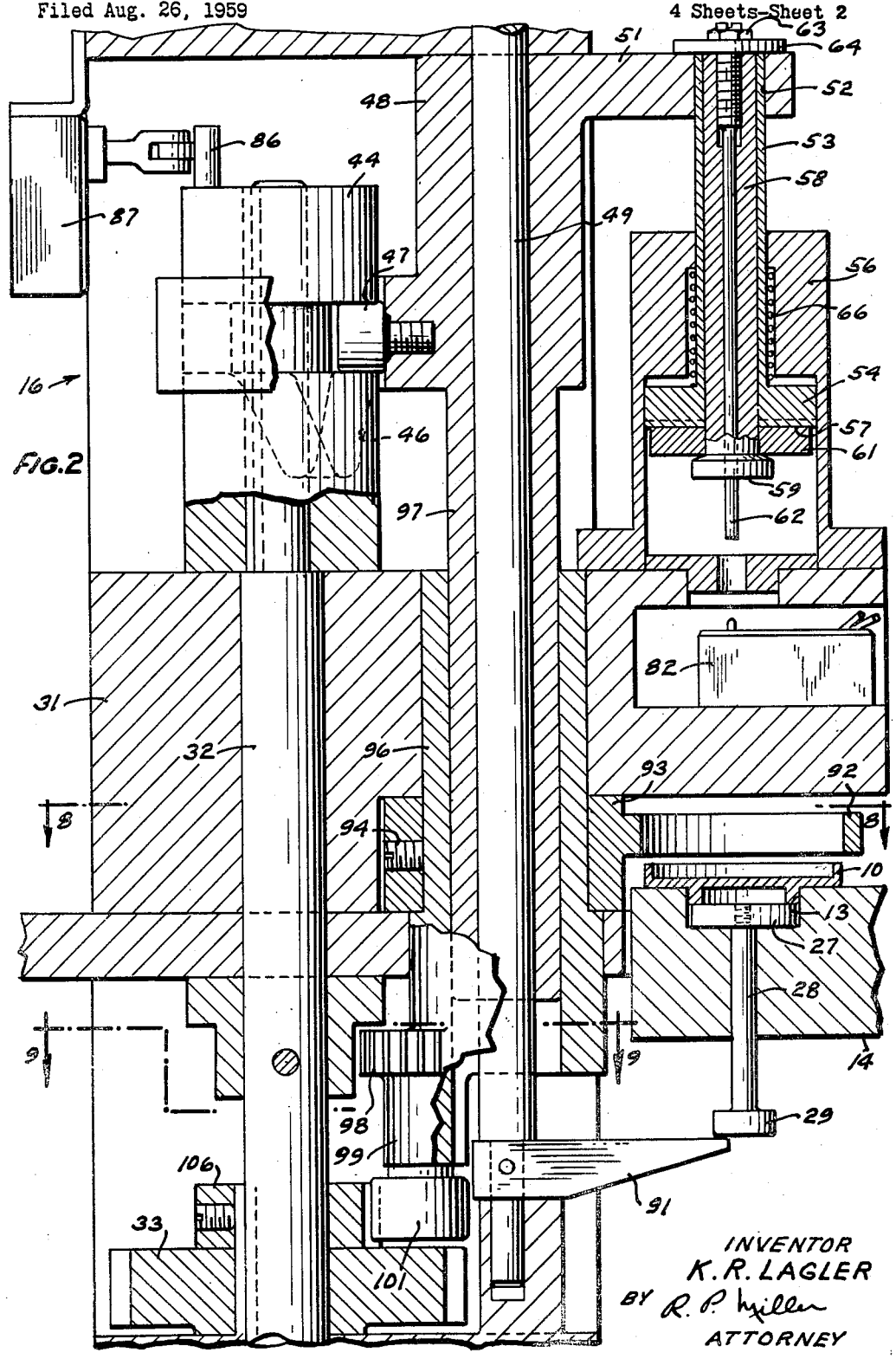

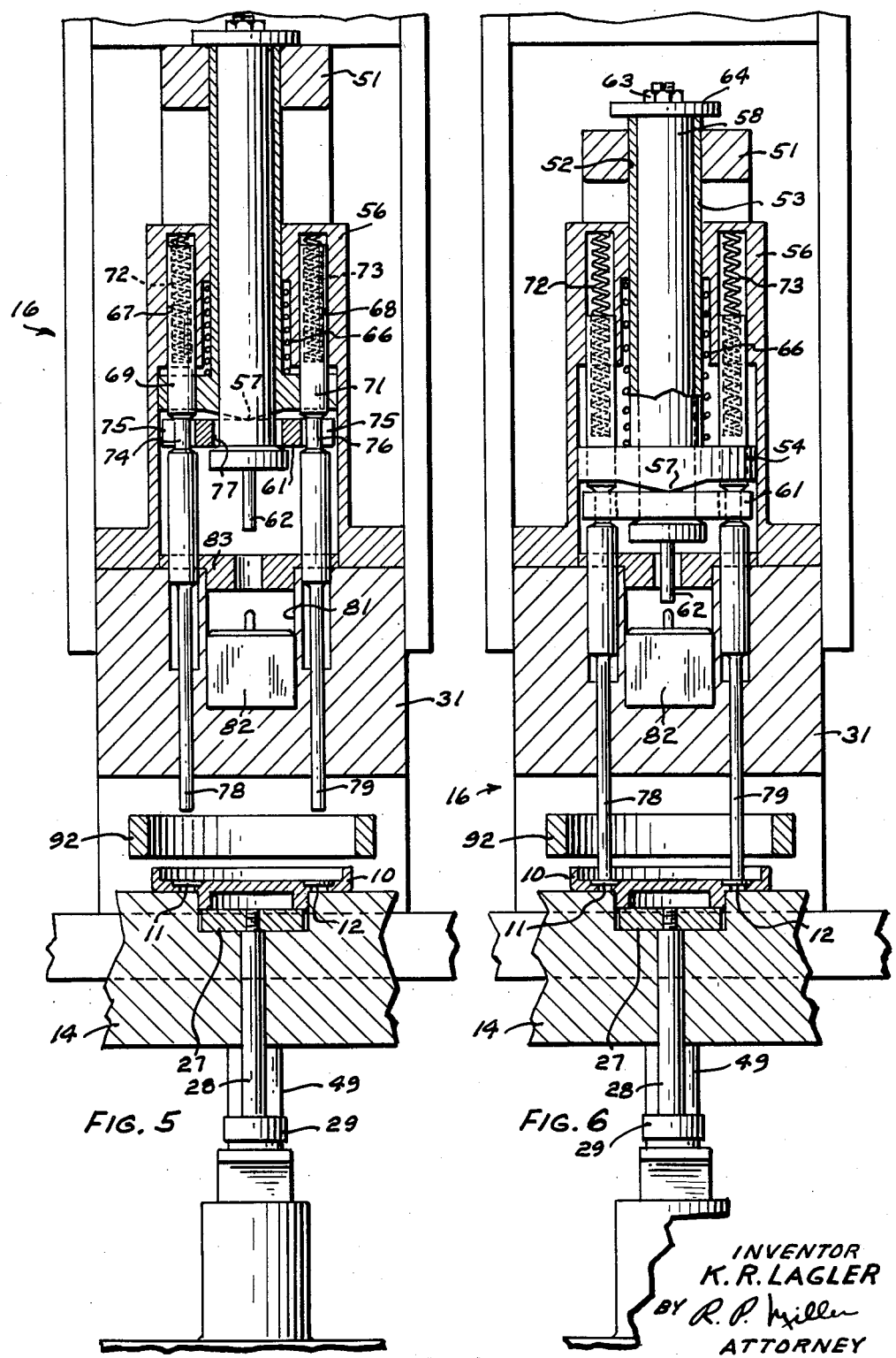

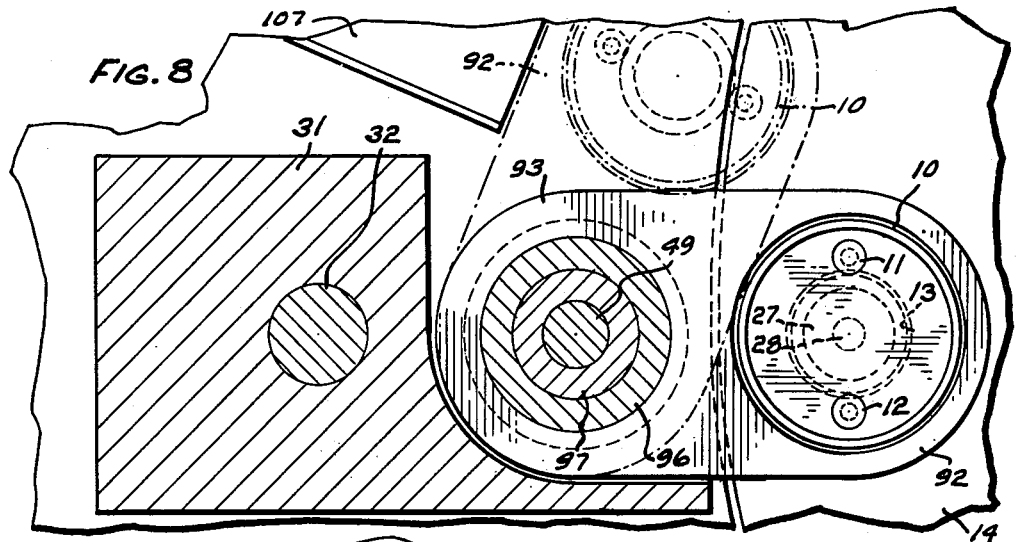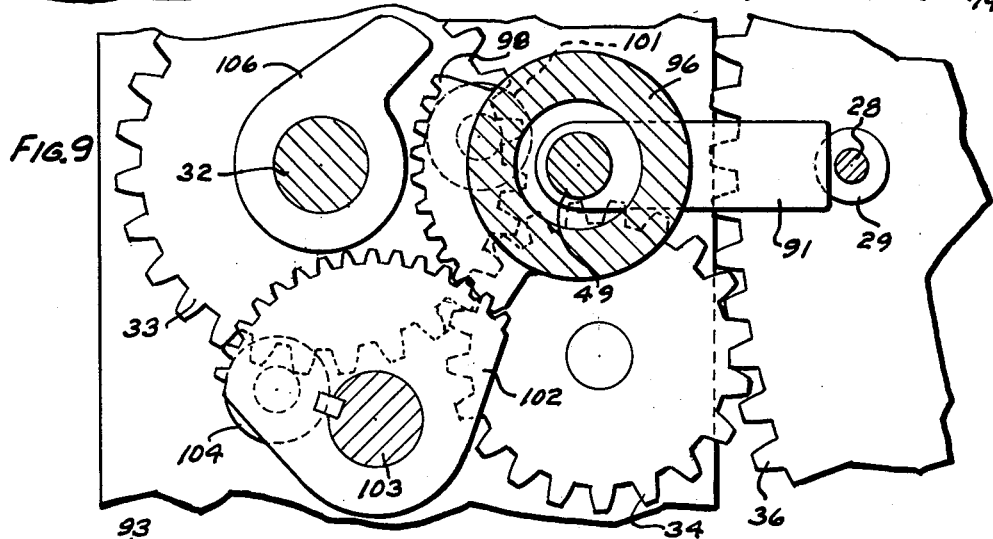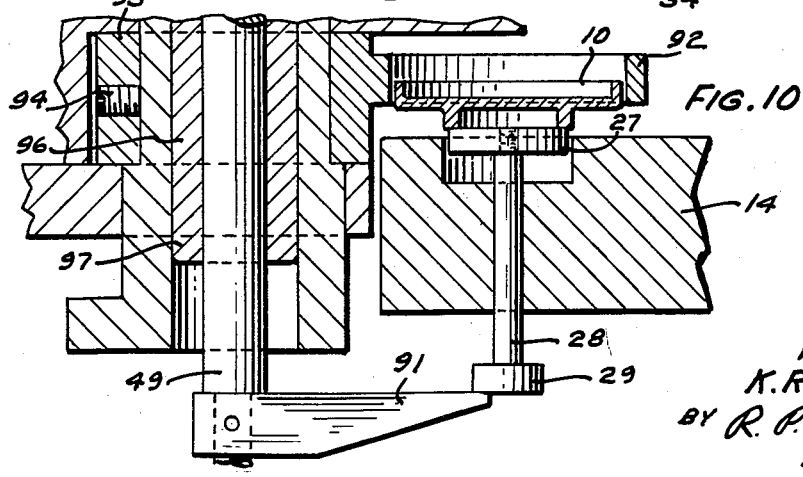

United States Patent Office 2,990,060
Patented June 27, 1961

2,990,060
ARTICLE INSPECTING APPARATUS
Karl R. Lagler, Indianapolis, Ind., assignor to Western Electric Company, Incorporated, New York, N.Y., a corporation of New York
Filed Aug. 26, 1959, Ser. No. 836,208
7 Claims. (Cl. 209—74)

This invention relates to article inspecting apparatus, and more particularly to a mechanical apparatus having a plurality of probes which selectively control the ejection of articles in accordance with conditions ascertained by the probes.

In automatic fabricating installations, it is of paramount importance that each article be inspected following each fabricating operation and that those articles found to be defective be ejected. Inspections can be performed either manually or automatically and where automatic inspection facilities are utilized, it is necessary to coordinate the operation of the facilities with the operation of an article feed device. These automatic facilities must be positive acting otherwise defective articles are produced intermixed with satisfactory articles at the receiving end of the installation. A further problem also exists in operation of such installations in that the production and retention of defective articles in the installation results in malfunction or damage to the subsequent fabricating devices.

It is a prime object of the present invention to provide a new and improved positive action article inspection apparatus.

A further object of the invention resides in an article sensing apparatus associated with facilities for ejecting articles having predetermined characteristics.

Another object of the invention is the provision of a cam-controlled mechanical device for ascertaining a predetermined condition of an article and accordingly controlling the selective ejection of the article by a cyclically operated mechanical ejector.

An additional object of the invention resides in an article sensing device operating in conjunction with an article feed device wherein facilities are selectively rendered effective upon the sensing device detecting a predetermined condition to remove and eject the article from the feed device.

A more finite object of the invention rests in a mechanical probing mechanism which inspects for the presence of components in articles advanced by a cyclically operated turntable and elevates articles therefrom having one or more components missing, whereafter the elevated articles are transferred to a discharge chute.

With these and other objects in view, the present invention contemplates a cyclically operated index table for advancing articles into a probing mechanism whereat each article is probed for the presence of components. If the probing mechanism ascertains that a component is missing, then further facilities are rendered effective to elevate the article from the turntable into the path of a cyclically operated ejector. A common source of power is utilized to drive both the turntable and the probing mechanism.

Other objects and advantages of the present invention will be apparent from the following detailed description when considered in conjunction with the accompanying drawings, wherein FIG. 1 is a top plan view, partially cut away, illustrating a turntable that is intermittently operated to advance articles to an inspecting apparatus;

FIG. 2 is an enlarged sectional view taken along line 2—2 of FIG. 1, particularly showing an operating mechanism for the inspecting apparatus that embodies the principles of the invention;

FIG. 3 is a fragmentary sectional view of a solenoid for selectively controlling the ejection of an article having a predetermined condition from the turntable;

FIG. 4 is a perspective view of one type of article that may be inspected by the apparatus shown in the other views;

FIG. 5 is an enlarged sectional view taken along line 5—5 of FIG. 1 of a probing mechanism showing the position of components prior to an inspection operation;

FIG. 6 is a sectional view similar to FIG. 5 showing the position of the components of the probing mechanism during an inspection operation of a satisfactory article;

FIG. 7 is a front elevational view, partially cut away, showing the position of the components of the probing mechanism upon ascertaining a predetermined unsatisfactory condition in the article;

FIG. 8 is a sectional view taken along line 8—8 of FIG. 2 depicting a cyclically operated ejector for receiving articles ascertained to have a predetermined condition;

FIG. 9 is a sectional view taken along line 9—9 of FIG. 2 depicting a mechanism for cyclically operating the ejector, and FIG. 10 is a partial sectional view similar FIG. 2, particularly illustrating a mechanism for lifting an article from the turntable into the ejector.

Referring first to FIG. 4 of the drawings, the part to be inspected by the apparatus shown in the other views is a disc-shaped bridge 10 of a telephone transmitter having a pair of diametrically opposed discs 11 and 12 inserted within suitable apertures. The bridges 10 are loaded by an attendant into indentations 13 formed in a turntable 14 (see FIG. 1) which is indexed to advance each bridge through a series of fabricating devices (not shown) and into an inspecting apparatus generally designated by the reference numeral 16. The inspecting apparatus 16 is mounted on a table 17 formed to encompass the turntable 14. When a bridge is advanced into the inspecting apparatus 16, the presence of the discs 11 and 12 is ascertained and those bridges found to have one or more discs missing are ejected from the turntable. If the inspecting apparatus 16 ascertains that both discs 11 and 12 are present, then the bridge is advanced by the turntable 14 into other fabricating devices (not shown).

As shown in FIG. 1, the turntable 14 is secured by a key 18 to a shaft 19 having a hub 21 from which radiate a number of evenly spaced drive pins 22. These drive pins are sequentially operated upon by a cam 23 to index the turntable. The cam 23 is secured to a constantly rotating drive shaft 24 and is provided with a trackway 26 that has two helical sections that cooperate with each succeeding pin 22 to rotate the shaft 19. When a pin 22 is positioned within the non-helical section of the trackway 26, the turntable is maintained in a stationary position so that the bridge 10 is positioned within the inspecting apparatus 16.

As shown in FIG. 2, each indentation 13 has mounted therein a disc 27 that is connected to a pin 28. The opposite extremity of each pin 28 is provided with a small circular plate 29. The function of the disc 27 is to lift each article 10 from the turntable 14 that is found to be defective by the inspecting apparatus 16.

Considering now the details of construction of the inspecting apparatus, attention is particularly directed to FIG. 2 wherein there is shown a cylindrical standard 31 mounted in the table 17. The standard 31 is bored to accommodate a shaft 32 having a gear 33 connected thereto. The gear 33 as shown in FIG. 1, meshes with a gear 34 that in turn meshes with a large gear 36 rotatably mounted on the shaft 19. The large gear 36 meshes with a pinion 37 connected to a bevel gear 38 that is driven by a bevel gear 39 mounted on a shaft 41. Shaft 41 receives motion from a spiral gear 42 meshing with a spiral gear 43 mounted on the constantly rotating shaft 24.

Returning now to FIG. 2, the shaft 32 is shown as having a cam member 44 secured in the vicinity of the upper terminus thereof. Cam member 44 has a circumferential cam trackway 46 into which projects a cam follower roller 47 extending from a slide frame or bracket 48. Frame 48 is adapted to move along an operating shaft 49 and is provided with a laterally extending arm 51. Slidably mounted in an aperture 52 formed in the arm 51 is a sleeve 53 having a circular flange 54 slidably mounted within a housing 56 that is firmly attached to the standard 31. The lower portion of the flange 54 is formed to provide a projecting fulcrum 57 (see also FIGS. 5 and 6). Positioned within the sleeve 53 is a rod 58 having a flange 59 that acts as a support for a wobble plate 61. The rod 58 is bored and threaded to receive a threaded switch actuator pin 62. A nut 63 is positioned on the threaded portion of the pin 62 to hold a washer 64 in engagement with the upper terminus of the rod 58 and the sleeve 53.

A compression spring 66 is fitted within a counterbore formed in the housing 56 and acts against the flange 54; thus the fulcrum 57 is urged into engagement with the wobble plate 61. The wobble plate in turn acts upon the flange 59 to urge the rod 58 in a downward direction and hence urge the washer 64 into engagement with the top of the sleeve 53. As illustrated in FIGS. 5 and 6, the housing 56 is provided with a pair of bores 67 and 68 into which are fitted the upper ends of a pair of probes 69 and 71 bored to receive a pair of compression springs 72 and 73 which function to urge the probes 69 and 71 to move in a downward direction relative to the housing 56. The probes 69 and 71 are provided with neck-down sections 74 and 76 that fit within a pair of slots 75 formed in the wobble plate 61. It will be noted from an inspection of FIGS. 2 and 5 that the wobble plate 61 is provided with an elongated slot 77, thus permitting the wobble plate to pivot on the fulcrum 57 upon relative movement of the probes 69 and 71 in the manner illustrated in FIG. 7. The lower termini of the probes 69 and 71 are reduced in diameter to provide feelers 78 and 79 which are positioned in alignment with the discs 11 and 12 of a bridge 10 that has been advanced within the inspecting apparatus 16. Positioned beneath the switch actuator 62 and within a cavity 81 formed in the standard 31 is a switch 82. An apertured plate 83 is positioned over the cavity 81 and provides a seat for the flange 59 when the feelers 78 and 79 ascertain that one or both of the discs 11 and 12 are missing from the bridge 10.

It may be appreciated that when the cam trackway 46 presents a dip to the roller 47, the slide frame 48 moves down. The arm 51 moves toward the housing 56, thus permitting the spring 66 to expand and move the flange 54 and sleeve 53 in a downward direction. Simultaneously therewith, the springs 72 and 73 also expand to move the probes 69 and 71 in a downward direction, thereby moving the feelers 78 and 79 into engagement with the aligned discs 11 and 12 of the bridge 10. If, as shown in FIG. 6, the discs 11 and 12 are present in the bridge 10, then continued movement of the feelers 78 and 79 is precluded. The wobble plate 61 is likewise precluded from further movement; hence, the flange 54 and the sleeve 53 are held in position. Inasmuch as the sleeve 53 engages the washer 64 and the washer is secured to the rod 58, the switch actuator 62 is held from engagement with the switch 82. It will be noted from FIG. 6 that the arm 51 moves from engagement with the stationary washer 64 when the feelers 78 and 79 ascertain the presence of the discs 11 and 12 which is an indication of a satisfactory bridge 10.

In a situation such as shown in FIG. 7 where the disc 11 is missing from the bridge 10, the feeler 78 will pass through the aperture formed in the bridge 10, whereas the feeler 79 will engage the disc 12 and be restrained from further movement. In this situation, the probe 69 moves relative to the probe 71; hence, the wobble plate 61 is pivoted on the fulcrum 57. This movement permits the flange 54 and the sleeve 53 to move a further distance with the arm 51 than in the situation where the feelers 78 and 79 ascertain the presence of both discs 11 and 12. This further movement of the sleeve 53 is accompanied by a like movement of the rod 58 and the switch actuator 62 to operate the switch 82. In the situation where the disc 12 is missing, the probe 71 will move relative to the probe 69 to again operate the switch 82. In the situation where both discs 11 and 12 are missing, both probes 69 and 71 will move a sufficient distance to permit the switch actuator 62 to operate the switch 82.

When the switch 82 is operated, a circuit for a solenoid 84 is conditioned for operation. Attached to the upper extremity of the cam member 44 is a pin 86 that functions to operate a switch 87 upon withdrawal of the feelers 78 and 79 from the bridge 10. When both switches 82 and 87 are operated, the solenoid 84 is energized to move the shaft 49 in an upward direction.

Attached to the lower extremity of the shaft 49 is an arm 91 positioned beneath the plate 29; hence, the plate 29, the pin 28 and the disc 27 are moved in an upward direction to move the defective bridge 10 into an ejector ring 92. The ejector ring 92 is provided with an apertured extension 93 that is secured by a set screw 94 to a sleeve 96 rotatably mounted on a cylindrical bearing portion 97 of the slide frame 48. Attached to the lower end of the sleeve 96 is a gear segment 98 (see FIGS. 2 and 9). Projecting from the lower surface of the gear segment 98 and offset from the axis of the sleeve 96 is a boss 99 providing a mounting for a cam follower roller 101. Meshing with the gear segment 98 is a gear segment 102 mounted on a stud shaft 103. Offset from the axis of the shaft 103 and extending from the under side of the gear segment 102 is a cam follower roller 104 positioned in the plane of the cam follower roller 101. A cam 106 is mounted on the shaft 32 and is adapted to engage the cam follower roller 101 to rotate the sleeve 96. Rotation of the sleeve 96 is imparted to the ejector ring 92 and if a bridge 10 is positioned within the ejector, it is moved from the turntable 14 in the manner illustrated on FIG. 8 by the broken line showing of the ejector ring 92. When the cam 106 engages the followers 101, the gear segment 98 acts to rotate the gear segment 101 to move the cam follower 104 into position to be engaged by the lobe on the cam 106. Cam 106 engages the cam follower 104 to impart a counterclockwise movement to the gear segment 102, whereby the gear segment 98 is rotated in a clockwise direction to restore the ejector ring 92 to the initial position in anticipation of another cycle of operation.

Considering the operation of the apparatus, assume first that a bridge 10 having discs 11 and 12 positioned therein is advanced into the inspecting apparatus 16; then subsequent rotation of the cam 44 imparts movement to the slide frame 48 to move the arm 51 in a downward direction. The compression springs 66, 72 and 73 expand to move the sleeve 53 and the probes 69 and 71 in a downward direction until the feelers 78 and 79 engage the discs 11 and 12, whereupon the wobble plate 61 is held stationary by the probes 69 and 71, and hence the sleeve 53, the rod 58 and the actuator 62 are held from further movement with the arm 51. The switch actuator 62 does not operate the switch 82; consequently, upon subsequent operation of the switch 87 by the pin 86, the solenoid 84 is not energized. The shaft 49 and the arm 91 are maintained in the position shown in FIG. 2. Subsequent rotation of the shaft 32 is sufficient to move the lobed portion of the cam 106 into engagement with the follower 101. This action causes the ejector ring 92 to move into the broken line position shown in FIG. 8. Inasmuch as the disc 27 did not elevate the bridge 10, the operation of the ejector ring 92 is ineffective to withdraw the bridge from the turntable 14.

In the situation where one of the discs is missing, such as disc 11 as shown in FIG. 7, the downward movement of the arm 51 is accompanied by a movement of the probe 69 to position the feeler 78 within the aperture formed in the bridge 10. The feeler 79 engages the disc 12 so that the probe 71 holds the righthand edge of the wobble plate 61. However, the lefthand portion of the wobble plate 61 pivots about the fulcrum 57 permitting the spring 66 to move the sleeve 53 a sufficient distance to move the actuator 62 into engagement with the switch 82. Following operation of switch 82, the cam member 44 is effective to withdraw the probes 69 and 71 and the feelers 78 and 79 to the initial position. When the pin 86 rotates into position to operate the switch 87, solenoid 84 is energized. The shaft 49 is drawn in an upward direction to move the arm 91 into engagement with the plate 29. The movement of the plate 29 is accompanied by the movement of the pin 28 and the disc 27 to elevate the bridge 10 into the ejector ring 92. When the cam 106 engages the follower 101, the ejector ring 92 sweeps the defective bridge 10 from the disc 27 and from the turntable 14 into a suitable discharge chute or receptacle 107. Following ejection of the defective bridge, the ejector ring 92 operates a switch (not shown) to restore the circuit 83 to the initial condition.

In order to operate the ejector ring 92, the cam 106 engages the cam follower roller 101 to rotate the gear segment 98, whereupon the gear segment rotates the gear segment 102 to position the cam follower roller 104 in the path of movement of the cam 106. The engagement of the cam 106 with the roller 104 is accompanied by a restoration of the gear segments 102 and 98 to the initial position. This action also effectuates a restoration of the ejector ring 92 to the initial position.

In the situation where both discs 11 and 12 are missing, the feelers 78 and 79 will pass through the apertures formed in the bridge, thus permitting the switch actuator 62 to engage and operate the switch 82. The ejection of the defective bridge is carried out in the manner described with respect to the ejection of a bridge having one disc missing.

It is to be understood that the above-described arrangements of apparatus and construction of elemental parts are simply illustrative of an application of the principles of the invention and many other modifications may be made without departing from the invention.

What is claimed is:

1. In a device for inspecting an article positioned on a support, a pin slidably mounted in the support and in alignment with an article on the support, a movably mounted probing device including a plurality of probes mounted for movement relative to each other, means for moving the probing device to advance the probes into engagement with an article on the support, and means operated by relative movement of said probes for moving said pin to lift the article from the support.

2. In combination, a probing device and an index table for supporting a plurality of circumferentially spaced articles, drive means for cyclically operating the index table to advance each article to the probing device, means mounted in the index table for lifting the articles therefrom, said probing device including a plurality of movably mounted sensing members, means operated by said drive means for moving the sensing members into engagement with each article advanced to the probing device, and means operated by a predetermined movement of any one or more of said sensing members for operating said lifting means.

3. In an article sensing and ejecting apparatus, a frame, a support in said frame for an article, a pin slidably mounted in said support for engaging and lifting an article positioned thereon, a rod slidably mounted in said frame, an arm extending from said rod for engaging and lifting said pins, means for reciprocating said rod to move said arm to lift said pins, a probing device movably mounted on said frame toward said article for ascertaining a predetermined condition of said article, means for moving said probing device toward said article, and means operated by said probing device ascertaining said predetermined condition for operating said reciprocating means to move said rod and pin to lift said article from said support.

4. In a device for probing an article positioned on a support, a frame, a bracket mounted in the frame for reciprocating movement toward and away from said support, said bracket having a pair of oppositely extending arms, a rod slidably supported in one of said arms above said support, a wobble plate pivotally supported on said rod and having a pair of oppositely disposed slots, a pair of probes mounted in said slots, means engaging the other arm for reciprocating said bracket to move said bracket and probes toward said support whereby movement of one probe into engagement with an article effectuates a relative movement between said probes to pivot said wobble plate, and an ejector operated by the pivoting of said wobble plate for removing an article positioned on said support.

5. In an article inspecting and ejecting apparatus, a support for an article, an ejector ring movably mounted above said support, a lifter pin slidably mounted within said support for lifting an article from the support into said ring, a discharge chute positioned adjacent to said support, a probing device mounted for movement toward and away from an article on said support, said probing device including means for sensing the absence of a component in said article, means for moving said probing device toward and away from said article to move said means into engagement with said article, means operated by said sensing means ascertaining the absence of a component for moving said lifter pin to advance the article within the ejector ring, and means for moving the ring from the position above said support to a position over said discharge chute.

6. In an apparatus for inspecting articles, a support for an article to be inspected, a movably mounted ejector spaced from said support, means for inspecting said article, means operated by said inspecting means for moving said article to said ejector, a first gear attached to and adapted to move said ejector, a second gear meshing with the first gear for rotating said first gear to restore said ejector to the initial position, a cam, a first cam follower mounted on and offset with respect to the axis of said first gear and positioned to be operated upon by said cam, a second cam follower mounted on and offset with respect to the axis of said second gear and positioned out of the path of the cam, and means for moving the cam to engage the first cam follower to rotate said first and second gears to move the second cam follower into the path of the cam.

7. In an article sensing and ejecting apparatus, a support for holding an article, a member having an aperture formed therein and positioned above said support for receiving said article, means for lifting an article from said support into said aperture, a probing device adapted to ascertain the absence of a component in said article, means for moving the probing device into engagement with said article, means operated by the probing device ascertaining the absence of a component for operating said lifting means to move said article within said aperture, a first gear attached to said member for moving said member, a second gear meshing with said first gear, a first cam follower attached to said first gear in offset relation of the center of the first gear, a second cam follower attached to said second gear in offset relation to the center of said second gear, a cam for engaging said first gear, and means for moving said cam past said first cam follower to rotate said gears to move the member and move the second cam follower into position to be engaged by the cam whereby the engagement of the cam with second cam follower rotates the gears to restore the member to the initial position.

References Cited in the file of this patent

UNITED STATES PATENTS

| | | |
|---|---|---|
| 2,696,107 | Blaing-Leisk | Dec. 7, 1954 |
| 2,781,126 | Wood | Feb. 12, 1957 |